US012794899B2

(12) United States Patent
Siswanto et al.

(10) Patent No.: US 12,794,899 B2
(45) Date of Patent: Nov. 10, 2026

(54) SYSTEM AND METHOD FOR CONFIGURABLE ENTITY PRIVILEGES

(71) Applicant: RAKUTEN MOBILE, INC., Tokyo (JP)

(72) Inventors: Dewa Siswanto, Tokyo (JP); Murugavel Natarajan, Bengaluru (IN); Vidyasagar Mishra, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/770,701

(22) PCT Filed: Feb. 9, 2022

(86) PCT No.: PCT/US2022/015740
§ 371 (c)(1),
(2) Date: Aug. 17, 2023

(87) PCT Pub. No.: WO2023/154039
PCT Pub. Date: Aug. 17, 2023

(65) Prior Publication Data
US 2024/0154971 A1 May 9, 2024

(51) Int. Cl.
*H04L 9/40* (2022.01)
*G06F 3/0482* (2013.01)
*G06F 3/04847* (2022.01)

(52) U.S. Cl.
CPC .......... *H04L 63/105* (2013.01); *G06F 3/0482* (2013.01); *G06F 3/04847* (2013.01)

(58) Field of Classification Search
CPC ... H04L 63/105; G06F 3/0482; G06F 3/04847
See application file for complete search history.

(56) References Cited

U.S. PATENT DOCUMENTS 8,655,880 B2 * 2/2014 Arora ...................... G06F 16/26 707/802
2008/0016490 A1 * 1/2008 Pabalate ................ G06Q 10/10 717/100

(Continued)

OTHER PUBLICATIONS

International Search Report dated May 23, 2022 from the International Searching Authority in International Application No. PCT/US2022/015740.

(Continued)

*Primary Examiner* — Oleg Survillo
(74) *Attorney, Agent, or Firm* — Sughrue Mion, PLLC

(57) ABSTRACT

A method of setting privileges for a user on an entity basis in an entity presentation system, includes: based on a first user input from a first user to set privileges of users with respect to an entity generated by the entity presentation system, controlling to output a graphical user interface (GUI) for setting the privileges; receiving a second user input for selecting a second user having a role pre-assigned from among a plurality of predetermined roles in the entity presentation system, each of the plurality of predetermined roles respectively being associated with a predetermined set of privileges; receiving a third user input, from the first user through the GUI, for selecting a first privilege from among the predetermined plurality of privileges; setting the first privilege for the second user with respect to the entity; and controlling access to the entity by the second user based on the first privilege.

20 Claims, 8 Drawing Sheets

(56) References Cited

U.S. PATENT DOCUMENTS

| | | | | |
|---|---|---|---|---|
| 2009/0157570 | A1* | 6/2009 | Pall | G06N 5/00 706/11 |
| 2017/0220546 | A1* | 8/2017 | Codrington | G06F 16/2282 |
| 2018/0060347 | A1* | 3/2018 | Bhattacharjee | G06F 16/951 |
| 2021/0271662 | A1 | 9/2021 | Muse et al. | |
| 2022/0413667 | A1* | 12/2022 | Sekiguchi | G06Q 10/101 |
| 2023/0028302 | A1* | 1/2023 | Kyleman | G06F 16/93 |
| 2023/0052372 | A1* | 2/2023 | Wilson | G06Q 50/18 |
| 2023/0214780 | A1* | 7/2023 | Fong | G06F 16/176 705/7.18 |
| 2023/0244848 | A1* | 8/2023 | Hahn | G06F 40/106 715/273 |
| 2024/0146769 | A1* | 5/2024 | Polstra | H04L 63/10 |

OTHER PUBLICATIONS

Written Opinion dated May 23, 2022 from the International Searching Authority in International Application No. PCT/US2022/015740.

* cited by examiner

SYSTEM AND METHOD FOR CONFIGURABLE ENTITY PRIVILEGES

CROSS REFERENCE TO RELATED APPLICATIONS

This application is a National Stage of International Application No. PCT/US2022/015740, filed Feb. 9, 2022.

BACKGROUND

Multiple applications may be hosted and deployed in a particular ecosystem (or system), such as a cloud platform for an enterprise or business. Each application may be used by users of the system to create, edit, view, delete, and/or otherwise take actions on an entity (such as viewable content, a report, a dashboard, a data connection, a dataset, etc.).

Typically, in order to access the applications deployed and entities stored in the system, a user must first be registered with the system and have a role assigned thereto from among a plurality of predetermined roles. The actions that the user is permitted to take with respect to an entity is defined by the role assigned to the user by a system administrator at the time of registration. That is, each role has a set of privileges associated therewith.

By way of example, three roles may be provided in a related art system: Administrator, Editor, and Viewer. The Administrator role may include the following privileges: assign user roles, create entities, edit entities, delete entities, clone entities, export entities, download entities, and view entities. The Editor role may include all of the privileges (or access rights) of the Administrator, other than the ability to assign user roles. The Viewer role, meanwhile, may only have the view privilege associated therewith. Thus, in the related art system, an entity can only be edited by a user if the role pre-assigned to the user includes the associated privilege (i.e., if the user's role is Administrator or Editor).

In related art systems, the set of privileges associated with a role cannot be changed by the user or an entity creator. Similarly, the role of a user cannot be changed on-the-fly or by an entity creator. Thus, if an entity creator desires to share an entity with another user and to allow the user to edit the entity, the entity creator is restricted by the role pre-assigned to the other user. In other words, if the other user was assigned a Viewer role at the time of registration, the entity creator cannot allow the other user to edit the entity without first requesting a change in the user's role from an Administrator. This process is time-consuming, burdensome, and inconvenient, particularly if an entity creator or owner wants to assign a privilege to the other user on an urgent basis.

Further, the role assigned to a user is system-wide, meaning that the set of privileges the user has as defined by the user's role are uniformly applicable for every application in the system. Thus, if a user's role is changed in order to grant certain privileges with respect to a particular entity, this would result in giving that user those same privileges with respect to all entities in the system. For example, an outside contractor or a guest may be registered as a Viewer in order to prevent the outside contractor or guest from being able to edit entities stored in the system. If, however, an entity creator or manager requests that the guest's role be changed to Editor in order to allow the guest to edit a particular entity, the guest will subsequently be permitted to edit any entity in the system. As a result, the overall security of the system diminishes.

Another constraint with respect to the related art role-based privileges is that an entity owner cannot restrict the privileges associated with a user's role. For example, if an entity owner would like to share a particular entity with another user that is pre-assigned an Editor role, but the entity owner does not want to permit the other user to edit the entity, the entity owner cannot implement such restriction without requesting that the user's role be changed.

Ultimately, the role-based privileges utilized in related art systems do not allow control of access and rights of users on an entity-basis. Further, the role-based privileges utilized in related art systems do not allow an entity owner to configure and control the access and rights of other users with respect to his or her entity.

SUMMARY

According to embodiments, systems and methods are provided that allow for user privileges to be configured on an entity (i.e., per-entity) basis.

According to embodiments, systems and methods are provided to output a graphical user interface (GUI) to a user (e.g., an entity creator, owner, or manager) to allow the user to set privileges for one or more other users (e.g., a single user or a predefined group of users) with respect to a particular entity.

According to embodiments, a method of setting privileges for a user on an entity basis in an entity presentation system, includes: based on a first user input from a first user to set privileges of users with respect to an entity generated by the entity presentation system, controlling to output a graphical user interface (GUI) for setting the privileges with respect to the entity; receiving a second user input, from the first user through the GUI, for selecting a second user, the second user having a role pre-assigned to the second user from among a plurality of predetermined roles in the entity presentation system, and each of the plurality of predetermined roles respectively being associated with a predetermined set of privileges from among a predetermined plurality of privileges for users with respect to the entity presentation system; receiving a third user input, from the first user through the GUI, for selecting a first privilege from among the predetermined plurality of privileges for accessing entities in the system; setting the first privilege for the second user with respect to the entity; and controlling access to the entity by the second user in accordance with the set first privilege.

The method may further include determining whether the first privilege is included in a first predetermined set of privileges associated with the pre-assigned role of the second user, wherein the setting the first privilege may include setting the first privilege for the second user with respect to the entity based on determining that the first privilege is included in the first predetermined set of privileges associated with the pre-assigned role of the second user.

The receiving the third user input may include receiving the third user input for selecting the first privilege and a second privilege from among the predetermined plurality of privileges for accessing entities in the system; and the method may further include: determining whether the second privilege is included in the first predetermined set of privileges associated with the pre-assigned role of the second user, and controlling to output a notification on the GUI indicating that the selected second privilege is not assignable to the second user, based on determining that the second privilege is not included in the first predetermined set of privileges.

The controlling to output the notification may include changing a display characteristic of an identifier of the second user displayed in response to the second user input for selecting the second user.

The method may further include determining whether the first privilege is included in a second predetermined set of privileges associated with a role of the first user pre-assigned to the first user from among the plurality of predetermined roles, wherein the setting the first privilege may include setting the first privilege for the second user with respect to the entity based on determining that the first privilege is included in the second predetermined set of privileges associated with the pre-assigned role of the first user.

The receiving the third user input may include receiving the third user input for selecting the first privilege and a second privilege from among the predetermined plurality of privileges for accessing entities in the system; and the method may further include: determining whether the second privilege is included in the second predetermined set of privileges associated with the pre-assigned role of the first user, and controlling to output a notification on the GUI indicating that the selected second privilege is not assignable to the second user, based on determining that the second privilege is not included in the second predetermined set of privileges.

The method may further include: receiving a request from the second user to access another entity generated by the entity presentation system; determining whether one or more entity privileges with respect to the other entity are set for the second user; and controlling access by the second user to the other entity in accordance with a first predetermined set of privileges associated with the pre-assigned role of the second user, based on determining that the one or more entity privileges with respect to the other entity are not set for the second user.

The method may further include: receiving a request from the second user to access another entity generated by the entity presentation system; determining whether one or more entity privileges with respect to the other entity are set for the second user; and controlling access by the second user to the other entity in accordance with the one or more entity privileges and not a first predetermined set of privileges associated with the pre-assigned role of the second user, based on determining that the one or more entity privileges with respect to the other entity are set for the second user.

The setting the first privilege for the second user with respect to the entity may include controlling to send to the second user an invitation to access the entity in accordance with the set first privilege.

According to embodiments, an entity presentation system for setting privileges on an entity basis to users, includes: a memory storing instructions; and at least one processor configured to execute the instructions to: based on a first user input from a first user to set privileges of users with respect to an entity generated by the entity presentation system, control to output a graphical user interface (GUI) for setting the privileges with respect to the entity; receive a second user input, from the first user through the GUI, for selecting a second user, the second user having a role pre-assigned to the second user from among a plurality of predetermined roles in the entity presentation system, and each of the plurality of predetermined roles respectively being associated with a predetermined set of privileges from among a predetermined plurality of privileges for users with respect to the entity presentation system; receive a third user input, from the first user through the GUI, for selecting a first privilege from among the predetermined plurality of privileges for accessing entities in the system; set the first privilege for the second user with respect to the entity; and control access to the entity by the second user in accordance with the set first privilege.

The at least one processor may be further configured to execute the instructions to: determine whether the first privilege is included in a first predetermined set of privileges associated with the pre-assigned role of the second user; and set the first privilege for the second user with respect to the entity based on determining that the first privilege is included in the first predetermined set of privileges associated with the pre-assigned role of the second user.

The at least one processor may be further configured to execute the instructions to: receive the third user input for selecting the first privilege and a second privilege from among the predetermined plurality of privileges for accessing entities in the system; determine whether the second privilege is included in the first predetermined set of privileges associated with the pre-assigned role of the second user; and control to output a notification on the GUI indicating that the selected second privilege is not assignable to the second user, based on determining that the second privilege is not included in the first predetermined set of privileges.

The at least one processor may be further configured to execute the instructions to: output the notification by changing a display characteristic of an identifier of the second user displayed in response to the second user input for selecting the second user.

The at least one processor may be further configured to execute the instructions to: determine whether the first privilege is included in a second predetermined set of privileges associated with a role of the first user pre-assigned to the first user from among the plurality of predetermined roles; and set the first privilege for the second user with respect to the entity based on determining that the first privilege is included in the second predetermined set of privileges associated with the pre-assigned role of the first user.

The at least one processor may be further configured to execute the instructions to: receive the third user input for selecting the first privilege and a second privilege from among the predetermined plurality of privileges for accessing entities in the system; determine whether the second privilege is included in the second predetermined set of privileges associated with the pre-assigned role of the first user; and control to output a notification on the GUI indicating that the selected second privilege is not assignable to the second user, based on determining that the second privilege is not included in the second predetermined set of privileges.

The at least one processor may be further configured to execute the instructions to: receive a request from the second user to access another entity generated by the entity presentation system; determine whether one or more entity privileges with respect to the other entity are set for the second user; and control access by the second user to the other entity in accordance with a first predetermined set of privileges associated with the pre-assigned role of the second user, based on determining that the one or more entity privileges with respect to the other entity are not set for the second user.

The at least one processor may be further configured to execute the instructions to control access by the second user to the other entity in accordance with the one or more entity privileges and not the first predetermined set of privileges associated with the pre-assigned role of the second user, based on determining that the one or more entity privileges with respect to the other entity are set for the second user.

The at least one processor may be further configured to execute the instructions to control to send to the second user an invitation to access the entity in accordance with the set first privilege.

According to embodiments, a non-transitory computer-readable recording medium has recorded thereon instructions executable by at least one processor to perform a method of setting privileges for a user on an entity basis in an entity presentation system, the method including: based on a first user input from a first user to set privileges of users with respect to an entity generated by the entity presentation system, controlling to output a graphical user interface (GUI) for setting the privileges with respect to the entity; receiving a second user input, from the first user through the GUI, for selecting a second user, the second user having a role pre-assigned to the second user from among a plurality of predetermined roles in the entity presentation system, and each of the plurality of predetermined roles respectively being associated with a predetermined set of privileges from among a predetermined plurality of privileges for users with respect to the entity presentation system; receiving a third user input, from the first user through the GUI, for selecting a first privilege from among the predetermined plurality of privileges for accessing entities in the system; setting the first privilege for the second user with respect to the entity; and controlling access to the entity by the second user in accordance with the set first privilege.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
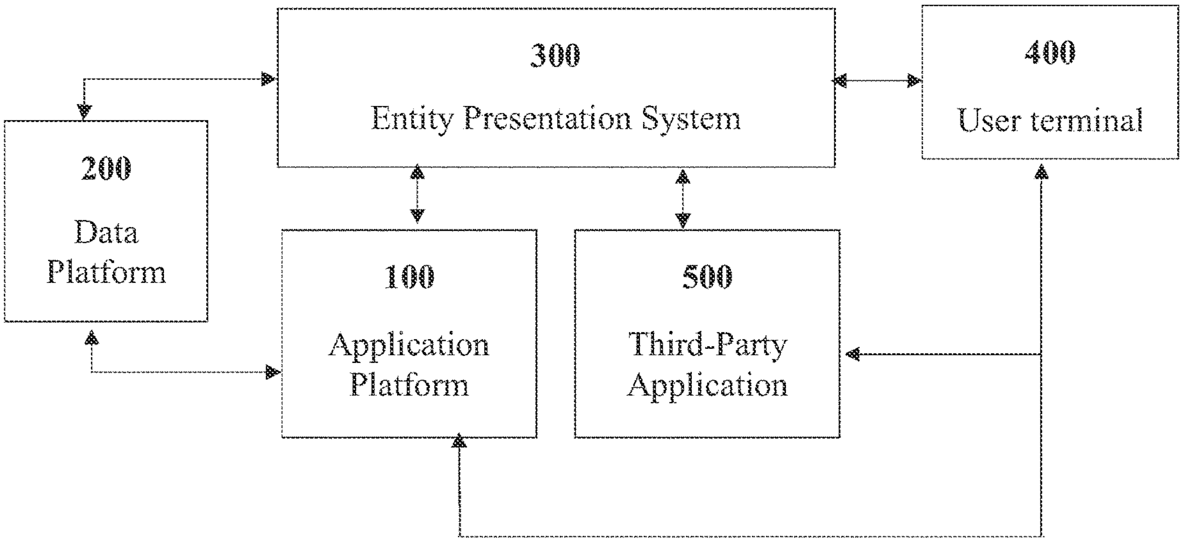
FIG. 1 is a diagram of a system architecture according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide an entity presentation system (e.g., a centralized data presentation system, such as the one described in PCT/US2022/012845 incorporated herein by reference) communicatively coupled to a plurality of applications and/or at least one user terminal, wherein a user can access the entity presentation system to create, edit, configure, or view one or more entities (e.g., data visualization, data dashboards, data reports, datasets, etc.) in accordance with privileges associated with the user and configured on a per-entity basis.

According to one or more example embodiments, the privileges are associated with the user on a per-entity basis. As a result, a user's access to an entity is not necessarily defined or otherwise restricted by a user's pre-assigned role in the system. Instead, a creator, owner, or manager of an entity can control access and privileges with respect to an entity on a per-user (or group of users) basis. This eliminates the need to create new roles or request a system administrator to reassign a role of the user in order to accommodate the accesses or privileges desired for a particular entity.

According to one or more example embodiments, a graphical user interface (GUI) is provided to a creator, owner, or manager of an entity to easily allow the creator, owner, or manager of the entity to set privileges on a per-user (or group of users) basis with respect to that entity. As a result, the creator, owner, or manager of the entity can easily and conveniently configure access and privileges for the entity without being restricted to the pre-assigned roles of users in the system.

According to one or more example embodiments, the privileges assignable for a particular entity may be restricted based on the role of the assignor (e.g., the entity creator, owner, manager, etc.) and/or based on the role of the assignee (i.e., the user to whom the entity privileges are being assigned). Specifically, in related art systems, all privileges associated with a role are assigned to a user when the user is registered to the system (e.g., a user having a viewer role will have all viewer associated privileges such as view, export, download, etc.). According to one or more embodiments, when a user is registered to the system, the system assigns one or some of the privileges (e.g., a predetermined, lowest or least privilege associated with the role) to the user (e.g., all viewer users will only be assigned a view privilege and not export, download, etc., other privileges associated with the viewer role), and the system allows the assignor to specify which additional privilege(s) associated with the role of the assignee should be provided to the user (e.g., the assignor can assign view and export privileges to viewer user A, and can assign only view privilege to viewer user B). As a result, access rights and privileges can be assigned with greater flexibility (i.e., on a per-entity and per-user/user group basis) while maintaining overall system security in accordance with the roles pre-assigned to users by a system administrator or system policy.

FIG. 1 is a diagram of a system architecture according to one or more embodiments. Referring to FIG. 1, the system includes an application platform 100, a data platform 200, an entity presentation system 300 (e.g., a centralized data presentation system), a user terminal 400, and a third-party application 500.

The application platform 100 is a platform that hosts and/or deploys one or more applications. The application platform 100 may be a cloud platform including one or more servers in which the one or more applications are deployed. For example, the application platform 100 may be a cloud platform for a particular business or enterprise in which applications are deployed for use by employees and/or customers of the business (e.g., applications for day-to-day operations of the business, processing or inputting sales information, communicating with customers, troubleshooting, etc.). The applications in the application platform 100 are configured to output or expose data that may be used for analysis and/or presentation (e.g., visualization, dashboarding, etc.).

The data platform 200 is communicatively connected or coupled to the application platform 100 and receives the data output by the one or more applications. The data platform 200 is a storage repository (e.g., one or more servers, data lake, data warehouse, etc.) that stores the data received from the application platform 100. By way of example, the data platform 200 may be a data lake that receives and stores data output from the application platform 100 in its native form. Further, the data platform 200 may store datasets corresponding to the applications in the application platform 100.

The entity presentation system 300 is communicatively connected or coupled to the data platform 200, and is configured to create, edit, and output entities (e.g., data presentations) from the data stored in the data platform 200. The entity presentation system 300 may also be communicatively connected or coupled to the application platform 100, and configured to output entities to one or more applications in the application platform 100. In some embodiments, the entity presentation system 300 includes one or more computing devices (e.g., servers) having memory for storing executable instructions and at least one processor for executing those instructions to perform the functions (described in further detail below) of the entity presentation system 300.

The user terminal 400 is a user device through which a user accesses the entity presentation system 300 directly, or indirectly via an application, namely, an application in the application platform 100 or the third-party application 500. Through the user terminal 400, an end user may generate, configure, delete, share, download, and/or view an entity in accordance with at least one of the user's pre-assigned role in the system and privileges assigned to the user with respect to the entity, as will be set forth in further detail below.

Figure 2:
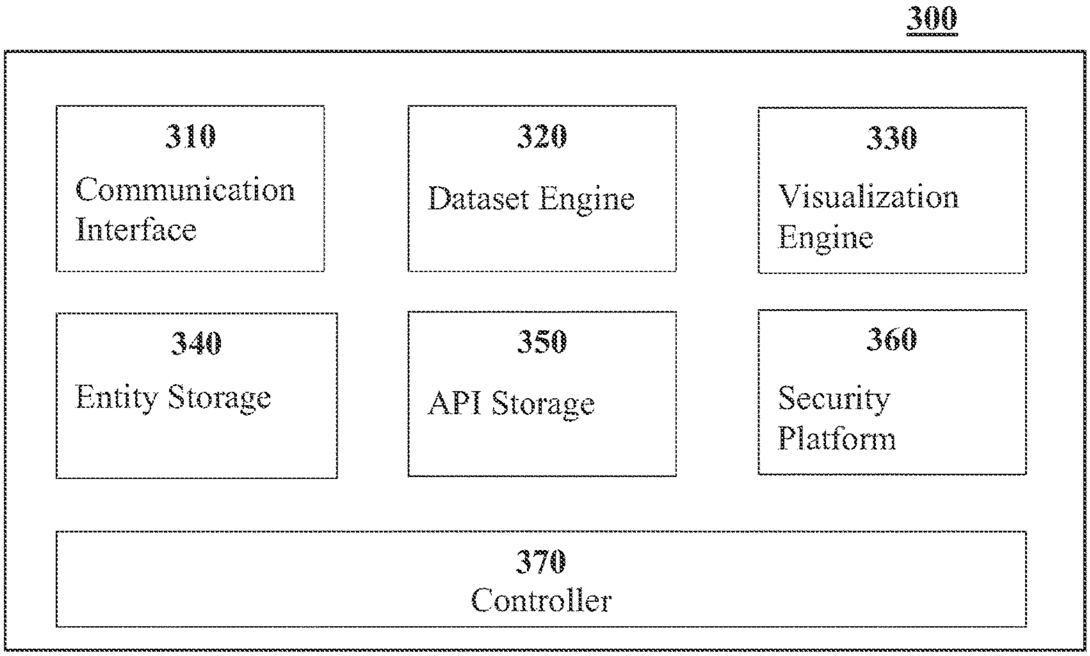
FIG. 2 is a block diagram of an entity access system according to an embodiment.

FIG. 2 is a block diagram of the entity presentation system 300 according to an embodiment. Referring to FIG. 2, the entity presentation system 300 includes a communication interface 310, a dataset engine 320, a visualization engine 330, an entity storage 340 (e.g., data presentation storage), an API storage 350, a security platform 360, and a controller 370. In some embodiments, the entity storage 340, the API storage 350, and/or the security platform 360 are external to the entity presentation system 300.

The communication interface 310 is configured to communicatively connect or couple to the data platform 200, the application platform 100, and one or more user terminals 400 via a wired and/or wireless connection. The communication interface 310 may also connect to one or more third-party applications 500 in some embodiments. For example, the communication interface 310 may be directly connected to the data platform 200, the application platform 100, the third-party applications 500, and/or the one or more user terminals 400 via a cable (e.g., universal serial bus (USB), coaxial, etc.). By way of another example, the communication interface 310 may be connected to the data platform 200, the application platform 100, the third-party applications 500, and/or the one or more user terminals 400 via at least one network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, etc.), a public land mobile network (PLMN), a telephone network (e.g., the Public Switched Telephone Network (PSTN)), or the like, and/or a combination of these or other types of networks. The communication interface 310 may include at least one of an Ethernet interface, an optical interface, a coaxial interface, an infrared interface, a radio frequency (RF) interface, a USB interface, a Wi-Fi interface, a cellular network interface, or the like.

The dataset engine 320 is configured to receive (e.g., request or retrieve) one or more datasets from the data platform 200, via the communication interface 310, and process the data in accordance with a user request. For example, the dataset engine 320 may process the user request and perform an associated action based thereon, such as access a requested dataset from the data platform 200, standardize a form or format of the dataset, and provide the dataset to the visualization engine 330. For example, the data (or datasets) obtained from different applications may be of different formats. Accordingly, the dataset engine 320 converts a format(s) of the datasets into a standardized format for the data presentation system.

According to an embodiment, the dataset engine 320 may process raw or native data provided by the applications in the application platform 100 to generate datasets or data cubes having a standardized format, and store the datasets or data cubes in the data platform 200. According to another embodiment, a distinct dataset engine (e.g., included in the application platform 100 or the data platform 200) may process native data output by the applications into a standardized format for retrieval and processing by the dataset engine 320 in accordance with a user request.

The visualization engine 330 is configured to create, modify, refresh, and/or publish an entity (e.g., data visualization, report, dashboard, dataset, etc.) in accordance with a user request. For example, the visualization engine 330 may generate or modify the fields or components of a data presentation (e.g., dashboard, report template, etc.) in accordance with a user request. Further, the visualization engine 330 may obtain, from the dataset engine 320, datasets required to populate the data presentation in response to a user request or based on a predefined (e.g., default or user set) refresh period for a previously generated data presentation.

The entity storage 340 is configured to store entities generated or provided by the visualization engine 330. The entity storage 340 is further configured to store entity-based privileges on a per entity basis. That is, for any entity in which user privileges are defined (as will be described in further detail below), the privileges may be stored in association with the entity (e.g., together with the entity, logically mapped to the entity, etc.). The privileges may be stored in any suitable form, including a database, a table, etc., such that they may be retrieved upon an access request to a corresponding entity by a user. According to another embodiment, the entity-based privileges may be stored in the security platform 360, discussed below.

The entity storage 340 may include any device capable of storing data, such as a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The entity storage 340 may be implemented as a plurality of storage devices. Further, the entity storage 340 may store metadata, attributes, or information regarding each entity. For example, the metadata, attributes or information may include at least one of a creator (user information) of the entity, one or more applications (or modules) that are source of a dataset presented or used by the entity, a date and/or time of creation of the entity, and a name of the entity. The metadata, attributes, or information may be stored together with the entity (e.g., within the same file) or separately from the entity.

The API storage 350 is configured to store a plurality of APIs for accessing features of the entity presentation system 300. In one or more embodiments, the APIs contain or manage a list of features provided by the entity presentation system 300 (e.g., viewing report A, configuring dashboard B, etc.), and information of users associated with the features (e.g., ID of users who have access to such features, etc.). The APIs may be created by the entity presentation system 300 or provided by one or more external sources. The API storage 350 may include any device capable of storing data, such as a hard disk (e.g., a magnetic disk, an optical disk, a magneto-optic disk, and/or a solid state disk), a CD, a DVD, a floppy disk, a cartridge, a magnetic tape, and/or another type of non-transitory computer-readable medium, along with a corresponding drive. The API storage 350 may be implemented as a plurality of storage devices. The entity storage 340 and the API storage 350 may be physically distinct storages or may be logically distinct storages within a same storage device. According to an embodiment, the API storage 350 may be or include an API gateway.

The security platform 360 is configured to authenticate users accessing the data presentation system 300, and to manage access rights of users and/or applications to the data presentation system 300. The security platform 360 may store and/or manage at least one of user authentication information, application access rights, role-based user access rights or privileges, role-based group access rights or privileges, and entity-based privileges.

The user authentication information may include user identifiers or log-in names assigned to users upon registration to the system and corresponding password information. Accordingly, the security platform 360 may authenticate any user who access the data presentation system 300, either directly or indirectly via an application (e.g., an application in the application platform 100 or a third-party application 500 external from the application platform 100).

The application access rights may define or manage, for each application, the entities (if any) that the application has access rights to and/or any restrictions to the access (e.g., view-only). According to an embodiment, access to entities via an application may be restricted to view-only rights (although it is understood that one or more other embodiments are not limited thereto, and access rights for each application may be variably defined in the application access rights). The application access rights may be managed in a rights management table or store associating each application with corresponding rights (e.g., for each application, at least one of corresponding entities that that application has access to, corresponding rights or permissions for the application, etc.).

The role-based user access rights may define or manage, for each user, the access rights of the user. For example, the role-based user access rights may store or manage, for each user, a user role from among a plurality of predetermined roles (e.g., Administrator, Editor, Viewer). The user role may be assigned to the user at the time of registration to the system, e.g., by a system administrator. The user role defines the user's privileges for the system as a whole. To this end, each role has a predetermined and fixed set of privileges associated therewith. As will be set forth in greater detail below, a user's privileges to a particular entity may be restricted or expanded, relative to the user's role-based privileges, by any entity-based privileges assigned to the user by an entity owner or manager (i.e., a user that has rights to manage or assign privileges to the corresponding entity), in accordance with one or more embodiments. The role-based user access rights may be stored or managed in a rights management table or store associating each user (or registered user identifier) with a corresponding role assigned to the user.

The role-based group access rights may define or manage, for each of predefined or predetermined groups of users (e.g., manually-created or defined group, company department, etc.), the access rights of the group. For example, the role-based group access rights may store or manage, for each group, a role from among a plurality of predetermined roles (e.g., Administrator, Editor, Viewer). The group role may be assigned to the group at the of registration of the group to the system, e.g., by a system administrator. The group role defines the group's privileges for the system as a whole. To this end, each role has a predetermined and fixed set of privileges associated therewith. As will be set forth in greater detail below, a group's (or member of a group's) privileges to a particular entity may be restricted or expanded, relative to the group's role-based privileges, by any entity-based privileges assigned to the group (or a user in the group) by an entity owner or manager, in accordance with one or more embodiments.

The entity-based privileges define or manage, for each of one or more entities stored in the entity storage 340, privileges assigned to one or more users and/or one or more groups with respect to the corresponding entity. The privileges may be selected and assigned by an entity owner or manager from among a plurality of predetermined privileges (e.g., one or more of Edit, Download, Delete, Schedule, Copy, Share, View, etc.). The entity-based privileges may be stored in any suitable form such that they may be retrieved upon an access request to a corresponding entity by a user. By way of example, the entity-based privileges may be stored as a set of tables each defining user or group privileges for a corresponding entity, as shown in Tables 1 and 2 below:

TABLE 1

| ENTITY 1 | |
|---|---|
| User 1 | Edit, Download, Delete, Schedule, Copy, Share, View |
| User 2 | View |
| Group 1 | Edit, View |

TABLE 2

| ENTITY 2 | |
|---|---|
| User 1 | View |
| User 3 | Download, Copy, View |
| Group 2 | Edit, View |

According to another embodiment, the entity-based privileges may be stored externally to the security platform 360, e.g., in the entity storage 340 as described above. In this case, the security platform 360 may retrieve (e.g., request and receive) an entity's entity-based privileges upon a user's access request to the entity.

Further, and in accordance with another embodiment, the entity-based privileges may be stored on a user and/or group basis (in addition to or instead of on an entity basis). By way of example, the entity-based privileges may be stored as a set of tables each defining a user's or group's privileges for one or more entities, as shown in Tables 3, 4, and 5 below:

TABLE 3

| User 1 | |
|---|---|
| Entity 1 | Edit, Download, Delete, Schedule, Copy, Share, View |
| Entity 2 | View |
| Entity 3 | Edit, View |

TABLE 4

| User 2 | |
|---|---|
| Entity 1 | View |
| Entity 3 | Download, Copy, View |

TABLE 5

| Group 1 | |
|---|---|
| Entity 1 | View |
| Entity 3 | Download, Copy, View |
| Entity 4 | Edit, View |

By incorporating a security platform 360, every access (both direct and indirect) to the entity presentation system 300 and the entities stored therein (or thereby) can be managed to prevent unauthorized access and data leaks. Further, by storing entity-based privileges in addition to user and/or group roles, access to entities can be more finely and precisely controlled on an entity-by-entity basis with greater flexibility and latitude by an entity manager.

The controller 370 is configured to control overall operations of the entity presentation system 300 and the components thereof. The controller 370 may include at last one processor (e.g., a central processing unit (CPU), a system-on-chip (SoC), an accelerated processing unit (APU), a microprocessor, a microcontroller, a digital signal processor (DSP), a field-programmable gate array (FPGA), an application-specific integrated circuit (ASIC), a backend processing engine, or another type of processing component). In some implementations, the controller 370 includes one or more processors capable of being programmed to perform a function. The controller 370 may also include at least one memory, such as a random-access memory (RAM), a read only memory (ROM), and/or another type of dynamic or static storage device (e.g., a flash memory, a magnetic memory, and/or an optical memory) that stores information and/or instructions for use by the at least one processor.

Assignment of Entity-Based Privileges

The controller 370 may be configured to generate a graphical user interface and/or to provide the graphical user interface to a user terminal 400 via the communication interface 310, in order to allow for access to the entity presentation system 300 (either directly or via a third-party application 500 or an application in the application platform 100). The graphical user interface (e.g., a webpage or markup language file) may be stored in a storage (which may be included in or external from the centralized data presentation system 300). According to another embodiment, the graphical user interface may be stored in an external server. The graphical user interface may be accessed by the user terminal 400 via an application in the application platform 100, via a third-party application 500, or directly through a location identifier or address (e.g., uniform resource indicator (URI), a uniform resource locator (URL), a file path, etc.). The graphical user interface allows an end user to perform an action with the entity presentation system 300 (such as generate a data presentation, view a certain data presentation, configure the data illustration or reporting format in a data presentation, etc.) via certain functional elements presented on the graphical user interface, such as buttons, scroll bars, etc.

The graphical user interface (GUI) may allow a user (or a particular type of user, such as an Administrator or the manager of an entity) to set or edit privileges for a particular entity. For example, in response to a user selection of an item for setting privileges, a GUI object may be displayed. The GUI object may allow the user (e.g., entity manager) to select specific privileges to assign or grant to one or more other users and/or groups registered in the system.

Figure 3:
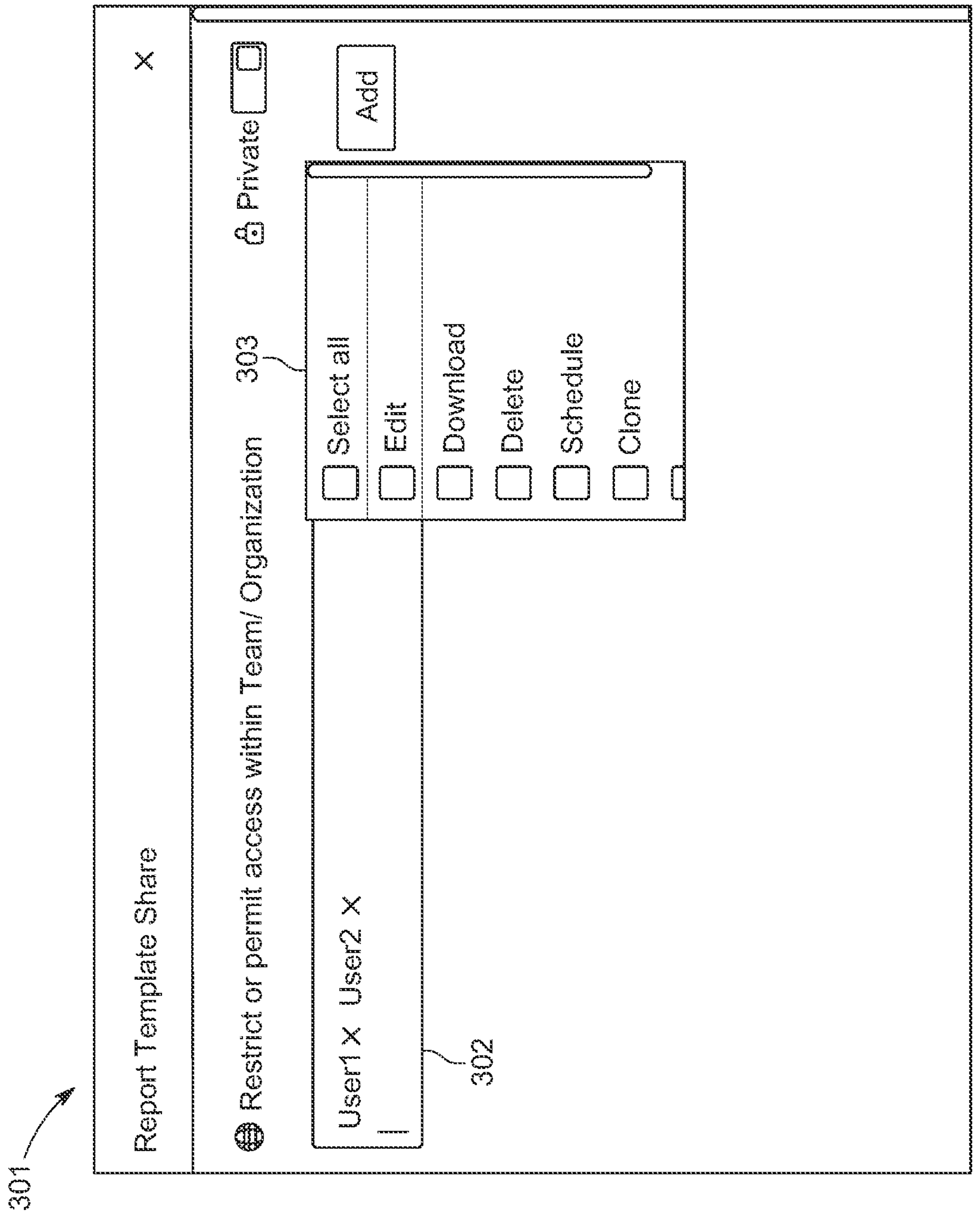
FIG. 3 is a graphical user interface for assigning entity-based privileges according to an embodiment.

An example of the GUI object 301 for assigning privileges is shown in FIG. 3. Referring to FIG. 3, the GUI object 301 includes a field 302 in which the user (assignor) can input one or more other users or groups (or registered user/group identifiers) for which to assign a corresponding set of privileges. The GUI object 301 further includes a list 303 (e.g., drop-down menu) of a set of assignable privileges, from which the assignor can select one or more privileges to assign to the one or more other users or groups included or input to the field 302.

According to an embodiment, the set of privileges that are assignable via the GUI object 301 may be restricted or defined in accordance with the assignor's role. That is, the set of privileges may include only those privileges that are associated with the assignor's role. For example, if the assignor is registered in the system as a Viewer, which includes only viewing privileges, than the assignor would only be permitted to assign viewing privileges to other users. The list 303 may include only those privileges that the assignor is permitted to assign or may include all privileges. In the latter case, those privileges that are assignable by the assignor may be distinguishable from those that are not assignable. For example, the privileges that are not assignable may be shaded, stricken through, or of a lighter color than those that are assignable, or a checkbox or item for selecting the privilege may only be displayed adjacent to those privileges that are assignable. Alternatively, any privilege may be selectable and an error message may be displayed if a privilege that is not assignable by the assignor is selected.

According to an embodiment, the set of privileges that are assignable via the GUI object 301 may be restricted or defined in accordance with a role of a user to which the privilege(s) are being assigned (assignee), i.e., the user input to the field 302. The list 303 may include only those privileges that are associated with a role of the assignee, or may include all privileges. In the latter case, those privileges that are assignable to the assignee in accordance with the assignee's role may be distinguishable from those that are not assignable, as set forth above. Alternatively, any privilege may be selectable and an error message may be displayed if a privilege that is not assignable to the assignee is selected.

The GUI object 301 may be displayed in response to a user selection of an item for setting privileges on a GUI or screen in which a particular entity is being created, edited, or viewed. Further, the GUI object 301 may be displayed in response to a user selection of an item for setting privileges on a GUI or screen in which a plurality of stored entities are listed (e.g., a screen in which a list of entities of a particular type that are accessible by the assignor is displayed).

Figure 4:
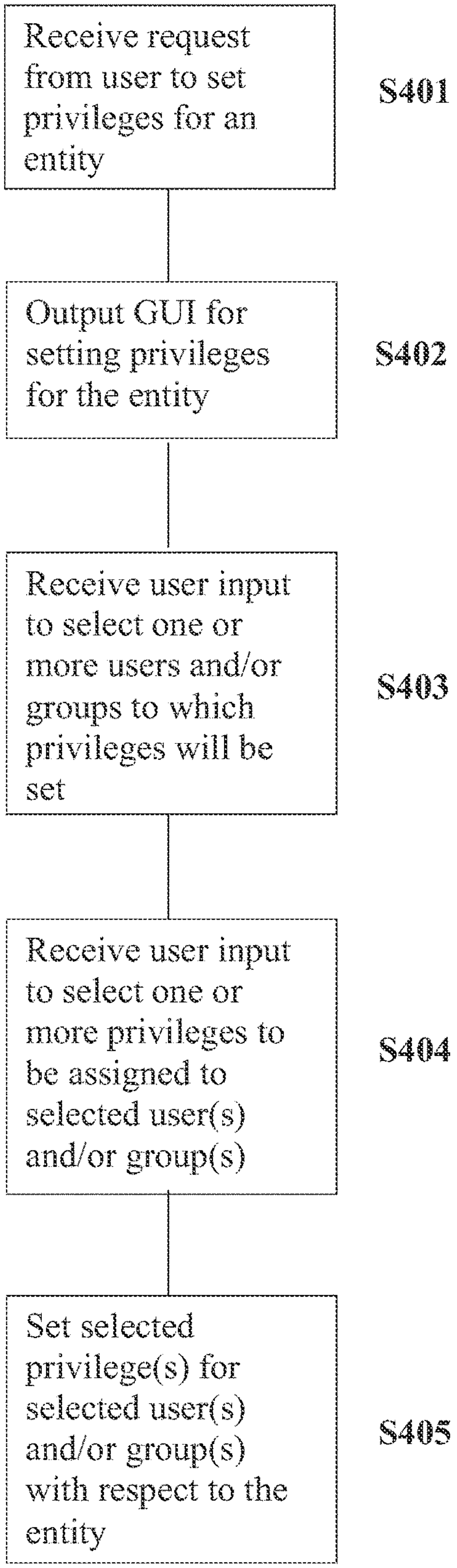
FIG. 4 is a flowchart illustrating a method of setting entity-based privileges according to an embodiment.

FIG. 4 is a flowchart illustrating a method of setting entity-based privileges according to an embodiment. Referring to FIG. 4, in operation S401, the entity presentation system 300 receives a request from a user to set privileges with respect to a particular entity. Alternatively, the request may be received to set privileges with respect to a plurality of entities. For example, the user may select one or more entities displayed in a list of entities and then select a GUI item for setting privileges. In operation S401, the request may be received via a selection of an item for setting privileges, where said item is displayed on a screen in which a particular entity is being viewed, edited, created, etc., or on a screen in which one or more entities are listed. Further, in operation S401, the request may be received or authorized for only a user that has a predefined privilege or right to assign entity-based privileges. For example, the request may be received or authorized for only a creator or manager of the corresponding entity.

In operation S402, a GUI (or GUI object) for setting privileges is displayed. The GUI may be a separate window or screen for setting the privileges, or may be an object or window overlaid on top of the screen through which the request is received in operation S401.

In operation S403, a user input to select one or more users and/or groups is received via the displayed GUI. For example, the user may input one or more identifiers or names of other registered users and/or groups in the system. The users and/or groups are registered in the system with predefined roles that are respectively associated with predetermined privileges.

In operation S404, a user input to select one or more privileges to be assigned to the selected users is received via the displayed GUI. For example, a list of assignable privileges may be displayed by selection of a drop down menu on the GUI. The user can then select one or more of the assignable privileges to be assigned to the one or more users selected in operation S403. It is understood that operations S403 and S404 may be performed (or re-performed) in any order according to various embodiments. In some embodiments, the list of assignable privileges is determined by the entity presentation system 300 based on the one or more users selected in operation S403. In some embodiments, wherein the operation S404 is performed before operation S403, the one or more users selectable by the user is determined by the entity presentation system 300 based on the one or more privileges selected by the user in operation S404.

In operation S405, the selected one or more privileges are set for the selected one or more users and/or groups with respect to the particular entity. In this case, the set one or more privileges (i.e., entity-based privileges) may be stored in the security platform 360, in the entity storage 340, or elsewhere in accordance with various embodiments. Further, the entity-based privileges may be stored together with (physically or logically) the corresponding entity, or may be mapped to the corresponding entity. Further, in operation S405, the selected one or more privileges may be set in response to a user input to a particular item or button displayed on the screen (such as a Confirm, Invite, or Share button). Further, upon setting the one or more entity-based privileges, a notification may be sent to the one or more users and/or groups selected in operation S403.

According to an embodiment, an entity-based privilege may be automatically assigned or set for a user based on another privilege being selected and set for the user. For example, if the entity manager assigns or sets an Edit entity-based privilege for another user with respect to an entity, then both the Edit privilege and the View privilege will be set for the other user with respect to that entity.

Figure 5:
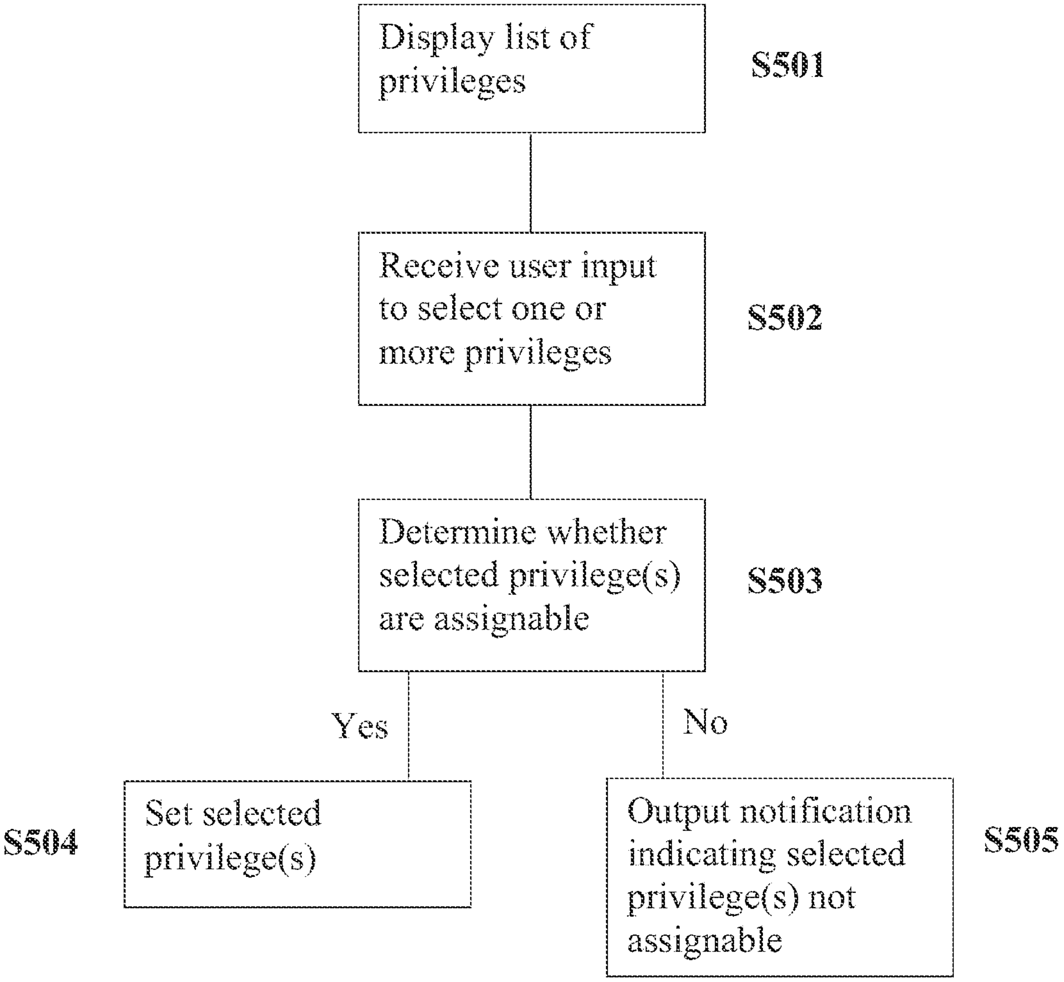
FIG. 5 is a flowchart illustrating a method of selecting entity-based privileges according to an embodiment.

FIG. 5 is a flowchart of a method of selecting entity-based privileges according to an embodiment. The method of FIG. 5 may correspond to operation S404 in FIG. 4.

Referring to FIG. 5, in operation S501, a list of privileges is displayed. The list of privileges may include all privileges that are predefined and pre-stored for assignment in the system. Further, the list of privileges may be received in response to selection of an item or button for displaying the list, such as a drop-down menu. In some embodiments, the list of privileges is generated by the entity presentation system 300 based on the one or more users selected in operation S403.

In operation S502, a user input to select one or more of the privileges included in the displayed list is received.

In operation S503, it is determined whether each of the selected one or more privileges is assignable. In this case, the determination may be made with respect to the assigning user's role registered in the system (i.e., the assignor's role), the assignee user's role registered in the system (i.e., the assignee's role), or both the assignor's role and the assignee's role, in accordance with various example embodiments.

Specifically, in accordance with an embodiment, a privilege may only be assigned by a user (assignor) if the privilege is included among the predetermined one or more privileges associated with the user's role. That is, the determination of operation S503 may compare each of the selected one or more privileges with the predetermined set of privileges associated with the assignor's role. For example, if the user is registered in the system as a Viewer (which does not permit editing) but selects the Edit entity-based privilege to assign to another user in operation S502, then it would be determined in operation S503 that the selected Edit privilege is not assignable.

Alternatively or additionally, a privilege may only be assigned to a user (assignee) if the privilege is included among the predetermined one or more privileges associated with that user's role. That is, the determination of operation S503 may compare each of the selected one or more privileges with the predetermined set of privileges associated with each assignee's role. For example, if the user/assignee (e.g., user selected in S403) is registered in the system as a Viewer (which does not permit editing) but the entity manager or assignor would like to select the Edit entity-based privilege to assign to the user in operation S502, then it would be determined in operation S503 that the selected Edit privilege is not assignable to the user. It is understood that this determination is made with respect to each user and/or group selected in operation S403. Further, it is understood that this determination may be made in response to selection of the privilege(s) or in response to selection of a user and/or group and with respect to privileges that are previously selected (e.g., if a user is subsequently selected after the selection of privileges in operation S502).

If it is determined that each of the selected privileges is assignable ("Yes" in Operation S503), then the method of selecting privileges ends at operation S504. In this case, the selected privileges may be set, as described above with reference to operation S405 in FIG. 4.

If, however, it is determined that one or more selected privileges is not assignable ("No" in Operation S503), then a message or notification is displayed in operation S505 that informs the user (assignor) that at least one of the selected privileges is not assignable. In this case, the message or notification may include information indicating which of the selected privileges is not assignable and a reason why. For example, the notification may indicate that one or more of the selected privileges is not assignable to at least one of the selected users and may instruct the assignor to either remove those selected users or change the selected privileges. Further, the GUI for assigning privileges may distinguishably display the user identification of those selected users for which at least one selected privilege is not assignable (e.g., by changing the color of the displayed user identification to red). Additionally, the notification may specifically indicate which of the selected privileges and/or which of the selected users/groups are the basis for the negative determination in operation S503.

Access to Entity

As set forth above with reference to FIG. 2, the controller 370 may be configured to provide a graphical user interface to a user terminal 400 via the communication interface 310, in order to allow for access to the entity presentation system 300. For example, the controller 370 may receive a request from a registered user of the system to open, view, or otherwise access a particular entity (e.g., datasource, dashboard, data presentation, report, etc.) stored in the entity storage 340. The controller 370 may provide the access in accordance with the user's role and any entity-based privileges assigned to the user.

For example, the controller 370 (or an API gateway) may forward the user's request and/or user information (e.g., identification information, a password, etc.) to the security platform 360 for authenticating the user, and receive an authorization based on the authentication. The user's authorization may be limited or defined based on the privileges associated with the user's pre-assigned role and any entity-based privileges assigned to the user. By way of example, the user may be registered as an Editor in the system, but may have only View and Copy privileges for a first entity and only View privileges for a second entity. Accordingly, upon requesting access to the first entity, the user's entity-based privileges for the first entity are retrieved and the user authorization that is obtained or determined by the controller 370 may be limited to only viewing and copying the first entity in accordance with the retrieved entity-based privileges. As such, the subsequent GUI or screen that is provided to the user terminal 400 for displaying the first entity may have other functionality (e.g., editing, deleting, etc.) disabled. Similarly, upon requesting access to the second entity, the user's entity-based privileges for the second entity are retrieved and the user authorization that is obtained or determined by the controller 370 may be limited to only viewing the second entity in accordance with the retrieved entity-based privileges. As such, the subsequent GUI or screen that is provided to the user terminal 400 for viewing the second entity may have other functionality (e.g., editing, deleting, copying, etc.) disabled.

According to an embodiment, if a request is received from a user to access an entity for which no entity-based privileges are assigned to the user, the user authorization may be determined in accordance with the user's pre-assigned role that is registered in the system. According to another embodiment, where no entity-based privileges are assigned to the user with respect to the entity, no user authorization may be given to the user irrespective of the user's role, or a predetermined user authorization may be given to the user (e.g., View-only or View and Download-only) irrespective of the user's role. According to still another embodiment, where no entity-based privileges are assigned to the user with respect to the entity, a predetermined authorization may be given to the user where said predetermined authorization varies in accordance with user role (e.g., View and Download-only where the user role is Editor, and View-only where the user role is Viewer). According to another embodiment, where no entity-based privileges are assigned to the user, the user may have only one or some of the privileges associated with the user's role. For example, where a Viewer role includes view, edit, download, and export privileges, users with a Viewer role may be restricted to only a view privilege for an entity for which no entity-based privileges are assigned to the users. In this case, the one or some of the privileges that are assigned by default may be one or more (but not all) privileges (e.g., a lowest or least ranked privilege) associated with the role.

Figure 6:
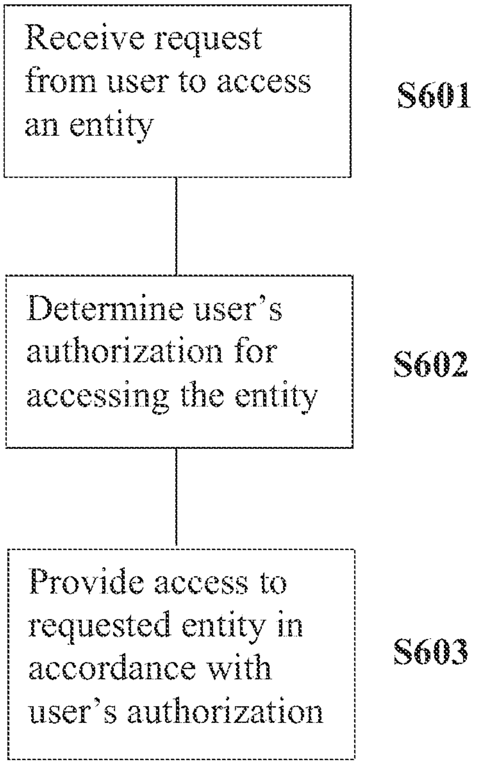
FIG. 6 is a flowchart of a method of providing access to a requested entity in an entity presentation system according to an embodiment.

FIG. 6 is a flowchart of a method of providing access to a requested entity in an entity presentation system according to an embodiment.

Referring to FIG. 6, in operation S601, a request is received from a user (e.g., from a user terminal) to access an entity. The request may be received from a registered user of the system to open or access an entity stored in the entity storage 340.

In operation S602, the user's authorization for accessing the entity is determined in accordance with the user's pre-assigned role and/or any entity-based privileges assigned to the user with respect to the entity. Here, the pre-assigned role is previously assigned to the user from among a plurality of predetermined roles with which predefined sets of privileges are respectively associated. Further, the entity-based privileges are any privileges previously set or assigned to the user with respect to the entity. The user's authorization may be a list of privileges determined for the user with respect to the entity.

In operation S603, access to the requested entity is provided to the user in accordance with the user's authorization determined in operation S602. For example, the entity may be provided to the user in a screen in which functionality corresponding to privileges not assigned or authorized for the user is disabled. Further, if it is determined in operation S602 that the user has no privileges with respect to the requested entity, then access to the requested entity is denied (e.g., a message indicating that access is denied may be displayed, provided, or transmitted to the user terminal). In some embodiments, if it is determined in operation S602 that the user has no privileges with respect to the requested entity, then a message indicating that the access is denied may be displayed, wherein the message includes options (e.g., contact info, link for initiate communication, etc.) for enabling the user to communicate with the entity manager to request the required privileges from the entity manager.

Figure 7:
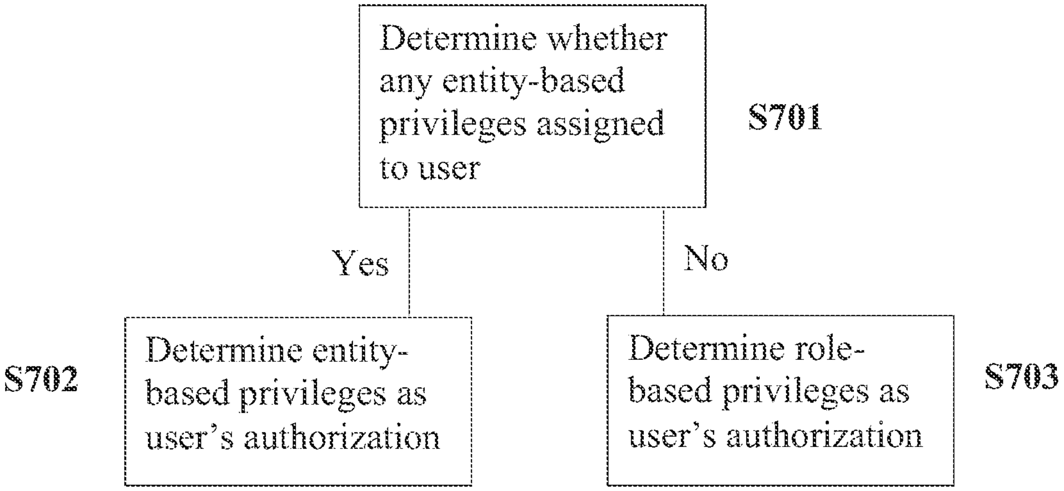
FIG. 7 is a flowchart of a method of determining a user's authorization with respect to an entity according to an embodiment.

FIG. 7 is a flowchart of a method of determining a user's authorization with respect to an entity according to an embodiment. The method of FIG. 7 may correspond to operation S602 in FIG. 6.

Referring to FIG. 7, in operation S701, in response to a request for access to an entity being received from a user, it is determined whether there are any entity-based privileges assigned to the user with respect to the entity. To this end, it may be determined whether any entity-based privileges are stored for the entity, and whether the stored entity-based privileges include any privileges assigned to the user. Alternatively, it may be determined whether any entity-based privileges are stored for the user, and whether the stored entity-based privileges include any privileges assigned with respect to the entity for which access is requested.

If it is determined that there are entity-based privileges assigned to the user with respect to the entity ("Yes" in operation S701), then the user's authorization is determined to include the entity-based privileges, in operation S702. In this case, the user's authorization may include more or less privileges than those privileges associated with the user's pre-assigned role, in accordance with an embodiment. In accordance with another embodiment, the user's authorization may not include any more privileges than those privileges associated with the user's pre-assigned role.

If it is determined that there are no entity-based privileges assigned to the user with respect to the entity ("No" in operation S701), then the user's authorization is determined to include the privileges associated with the role pre-assigned to the user in the system, in operation S703.

Graphical User Interface

Figure 8A:
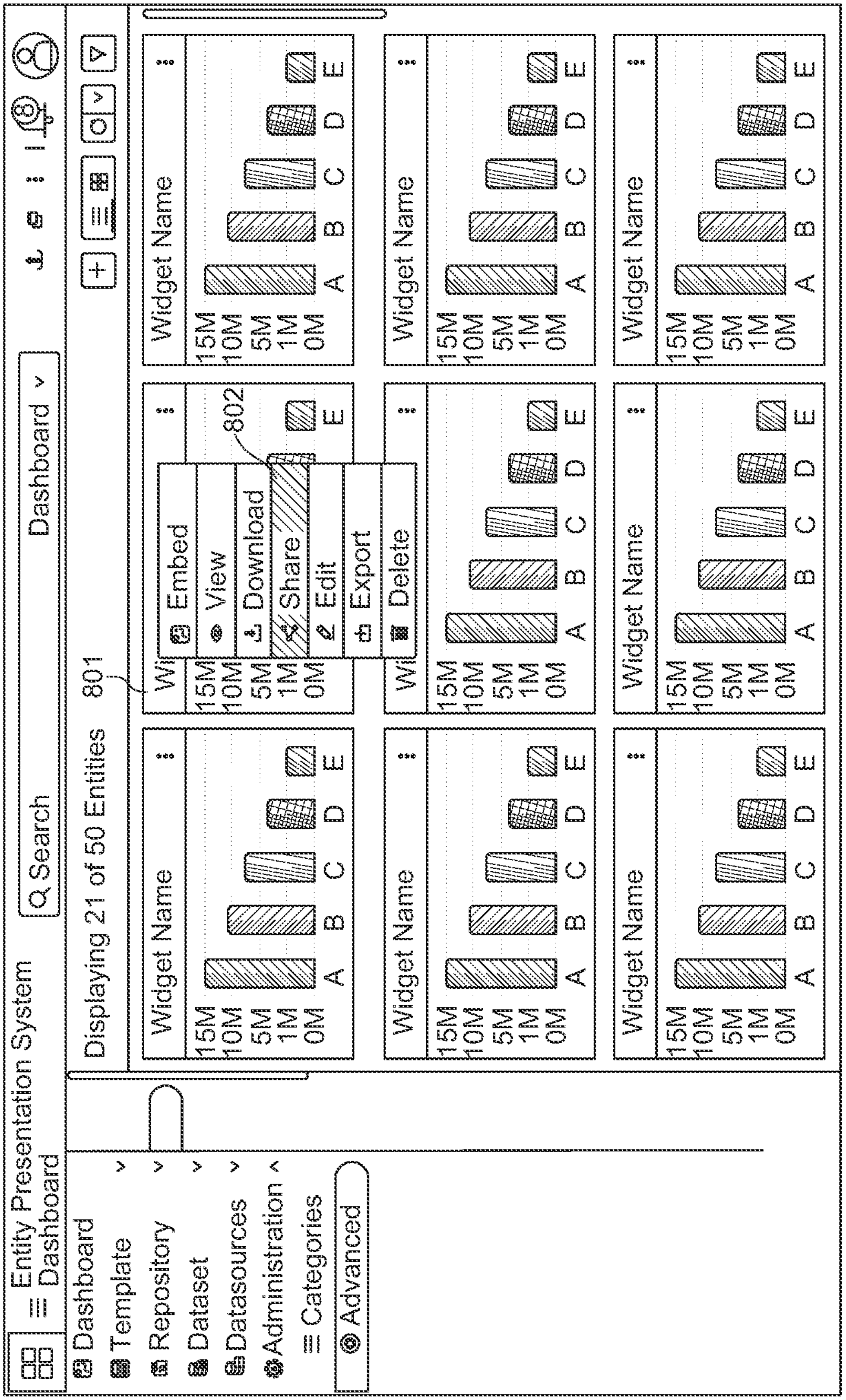
FIGS. 8A and 8B are screens of a graphical user interface for setting entity-based privileges according to one or more embodiments.
Figure 8B:
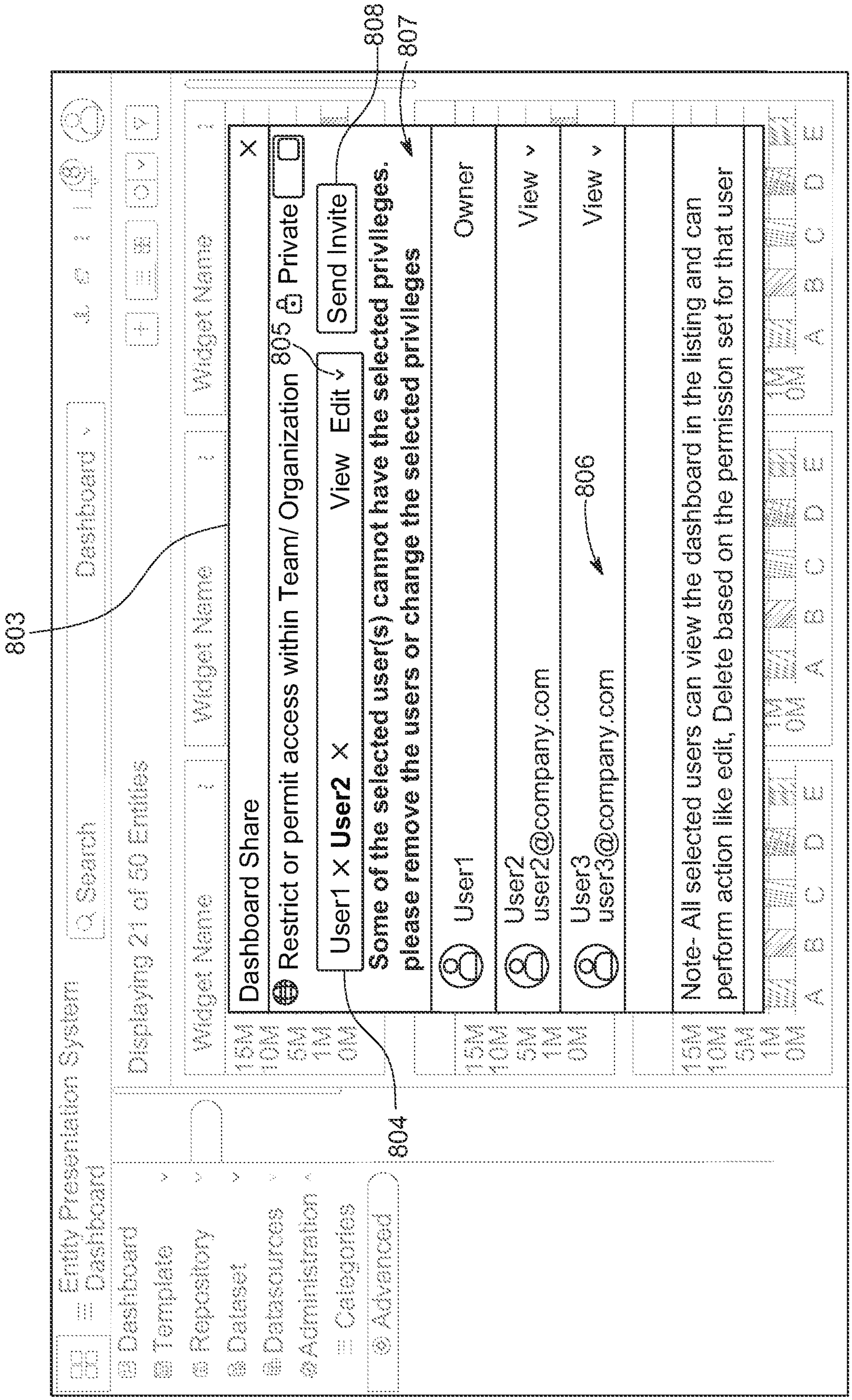

FIGS. 8A and 8B are screens of a graphical user interface for setting entity-based privileges according to one or more embodiments.

FIG. 8A illustrates a screen of a graphical user interface according to an embodiment in which a list of entities are displayed. In the example of FIG. 8A, the entities are dashboards, though it is understood that one or more other embodiments are not limited thereto. That is, the entities may be one or more of dashboards, data visualizations, reports, datasources (or datasource connections), datasets, content, etc. Further, while in the example of FIG. 8A the list is displayed as a rectangular array, it is understood that one or more other embodiments are not limited thereto. For example, the list may be a vertical listing of items.

Referring to FIG. 8A, a user may select an item 802 (e.g., "Share") for assigning entity-based privileges, with respect to a particular entity 801 in the list. For example, the item 802 may be selected from a drop-down menu of actions that the user may take for the corresponding entity in accordance with the user's role and/or entity-based privileges.

FIG. 8B illustrates a screen including a GUI 803 for assigning entity-based privileges, according to an embodiment. The GUI 803 may be displayed in response to the selection of the item 802 in the screen of FIG. 8A. In the example of FIG. 8B, the GUI 803 includes a field 804 through which users, to which privileges may be assigned with respect to the corresponding entity 801, may be input or selected. Further, the GUI 803 includes an item 805 selectable to display a list of assignable privileges for the corresponding entity 801. Additionally, the GUI 803 includes a list 806 of users associated to the entity (e.g., users to which entity-based privileges have previously been assigned (as well as an indication or a drop-down menu indicative of the entity-based privileges assigned thereto) and the assigned privileges, an owner of the entity, etc.).

In the example of FIG. 8B, one of the users input to the field 804 has a pre-assigned role that does not permit at least one of the selected privileges to be assigned to him or her. Accordingly, the user identifier for that user ("User2") is distinguished and a message 807 is displayed indicating that at least one of the users cannot have at least one of the selected privileges.

The GUI 803 also includes an item or button 808 selectable for setting the selected privileges for the selected users input to the field 804. In the example of FIG. 8B, upon selection of the item 808, the privileges are set (other than those privileges than cannot be assigned for a particular user) for the entity 801 and an invitation or notification message is sent to the selected users.

Figure 9:
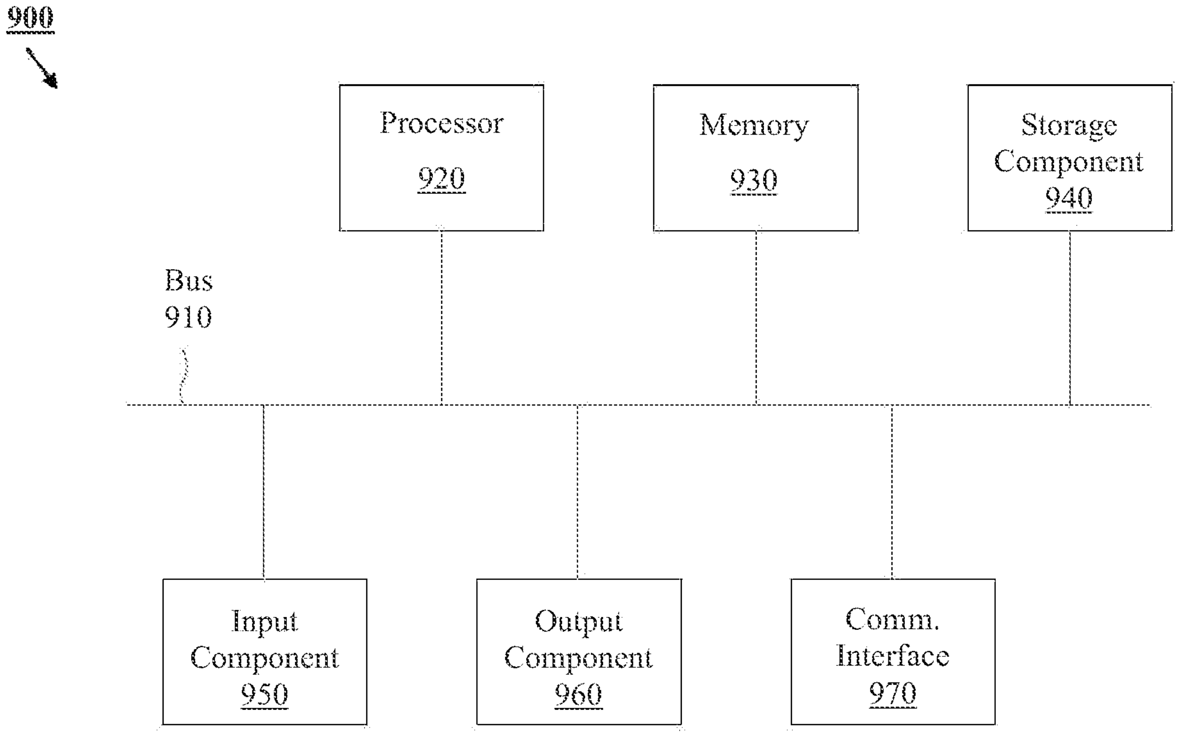
FIG. 9 is a diagram of components of one or more devices according to an embodiment.

FIG. 9 is a diagram of components of one or more devices according to an embodiment. Device 900 may correspond to a computing device described above (e.g., at least one server or device that implements or embodies the entity presentation system 300, at least one server or device that stores or deploys the application platform 100, at least one server or device that implements or embodies the data platform 200, at least one user terminal 400, etc.).

As shown in FIG. 9, the device 900 may include a bus 910, a processor 920, a memory 930, a storage component 940, an input component 950, an output component 960, and a communication interface 970. It is understood that one or more of the components may be omitted and/or one or more additional components may be included.

The bus 910 includes a component that permits communication among the components of the device 900. The processor 920 is implemented in hardware, firmware, or a combination of hardware and software. The processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 920 includes one or more processors capable of being programmed to perform a function.

The memory 930 includes a random access memory (RAM), a read only memory (ROM), and/or another type of dynamic or static storage device (e.g., a flash memory, a magnetic memory, and/or an optical memory) that stores information and/or instructions for use by the processor 920.

The storage component 940 stores information and/or software related to the operation and use of the device 900. For example, the storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 950 includes a component that permits the device 900 to receive information, such as via user input (e.g., a touch screen display, a keyboard, a keypad, a mouse, a button, a switch, and/or a microphone). The input component 950 may include a sensor for sensing information (e.g., a global positioning system (GPS) component, an accelerometer, a gyroscope, and/or an actuator).

The output component 960 includes a component that provides output information from the device 900 (e.g., a display, a speaker, and/or one or more light-emitting diodes (LEDs)).

The communication interface 970 includes a transceiver-like component (e.g., a transceiver and/or a separate receiver and transmitter) that enables the device 900 to communicate with other devices, such as via a wired connection, a wireless connection, or a combination of wired and wireless connections. The communication interface 970 may permit device 900 to receive information from another device and/or provide information to another device. For example, the communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

The device 900 may perform one or more processes described herein. The device 900 may perform operations based on the processor 920 executing software instructions stored by a non-transitory computer-readable medium, such as the memory 930 and/or the storage component 940. A computer-readable medium is defined herein as a non-transitory memory device. A memory device includes memory space within a single physical storage device or memory space spread across multiple physical storage devices.

Software instructions may be read into the memory 930 and/or the storage component 940 from another computer-readable medium or from another device via the communication interface 970. When executed, software instructions stored in the memory 930 and/or storage component 940 may cause the processor 920 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of setting privileges for a user on an entity basis in an entity presentation system, the method comprising:

based on a first user input from a first user to set privileges of users with respect to an entity generated by the entity presentation system, controlling to output a graphical user interface (GUI) for setting the privileges with respect to the entity;

receiving a second user input, from the first user through the GUI, for selecting a second user, the second user having a role pre-assigned to the second user from among a plurality of predetermined roles in the entity presentation system, and each of the plurality of predetermined roles respectively being associated with a predetermined set of privileges, with respect to the entity presentation system as a whole, from among a predetermined plurality of privileges for users with respect to the entity presentation system;

receiving a third user input, from the first user through the GUI, for selecting, on an individual privilege basis, at least a first privilege from among the predetermined plurality of privileges for accessing entities in the system;

setting the first privilege for the second user with respect to the entity, wherein the setting overrides, specifically for the entity, the predetermined set of privileges associated with the pre-assigned role of the second user, by expanding or restricting privileges of the second user, with respect to the entity, relative to the predetermined set of privileges; and controlling access to the entity by the second user in accordance with the set first privilege.

2. The method according to claim 1, further comprising:

determining, by at least one hardware processor of the entity presentation system, whether the first privilege is included in a first predetermined set of privileges associated with the pre-assigned role of the second user, wherein the setting the first privilege comprises setting the first privilege for the second user with respect to the entity based on determining that the first privilege is included in the first predetermined set of privileges associated with the pre-assigned role of the second user.

3. The method according to claim 2, wherein:

the receiving the third user input comprises receiving the third user input for selecting the first privilege and a second privilege from among the predetermined plurality of privileges for accessing entities in the system; and the method further comprises:

determining whether the second privilege is included in the first predetermined set of privileges associated with the pre-assigned role of the second user, and controlling to output a notification on the GUI indicating that the selected second privilege is not assignable to the second user, based on determining that the second privilege is not included in the first predetermined set of privileges.

4. The method according to claim 3, wherein the controlling to output the notification comprises changing a display characteristic of an identifier of the second user displayed in response to the second user input for selecting the second user.

5. The method according to claim 1, further comprising:

determining whether the first privilege is included in a second predetermined set of privileges associated with a role of the first user pre-assigned to the first user from among the plurality of predetermined roles, wherein the setting the first privilege comprises setting the first privilege for the second user with respect to the entity based on determining that the first privilege is included in the second predetermined set of privileges associated with the pre-assigned role of the first user.

6. The method according to claim 5, wherein:

the receiving the third user input comprises receiving the third user input for selecting the first privilege and a second privilege from among the predetermined plurality of privileges for accessing entities in the system; and the method further comprises:

determining whether the second privilege is included in the second predetermined set of privileges associated with the pre-assigned role of the first user, and controlling to output a notification on the GUI indicating that the selected second privilege is not assignable to the second user, based on determining that the second privilege is not included in the second predetermined set of privileges.

7. The method according to claim 1, further comprising:

receiving a request from the second user to access another entity generated by the entity presentation system;

determining whether one or more entity privileges with respect to the other entity are set for the second user; and controlling access by the second user to the other entity in accordance with a first predetermined set of privileges associated with the pre-assigned role of the second user, based on determining that the one or more entity privileges with respect to the other entity are not set for the second user.

8. The method according to claim 1, further comprising:

receiving a request from the second user to access another entity generated by the entity presentation system;

determining whether one or more entity privileges with respect to the other entity are set for the second user; and controlling access by the second user to the other entity in accordance with the one or more entity privileges and not a first predetermined set of privileges associated with the pre-assigned role of the second user, based on determining that the one or more entity privileges with respect to the other entity are set for the second user.

9. The method according to claim 1, wherein the setting the first privilege for the second user with respect to the entity comprises controlling to send to the second user an invitation to access the entity in accordance with the set first privilege.

10. The method according to claim 1, wherein the GUI allows the first user to select and set individual privileges, as opposed to roles, for other users with respect to the entity.

11. An entity presentation system for setting privileges on an entity basis to users, the entity presentation system comprising:

a memory storing instructions; and at least one processor configured to execute the instructions to:

based on a first user input from a first user to set privileges of users with respect to an entity generated by the entity presentation system, control to output a graphical user interface (GUI) for setting the privileges with respect to the entity;

receive a second user input, from the first user through the GUI, for selecting a second user, the second user having a role pre-assigned to the second user from among a plurality of predetermined roles in the entity presentation system, and each of the plurality of predetermined roles respectively being associated with a predetermined set of privileges, with respect to the entity presentation system, from among a predetermined plurality of privileges for users with respect to the entity presentation system;

receive a third user input, from the first user through the GUI, for selecting, on an individual privilege basis, at least a first privilege from among the predetermined plurality of privileges for accessing entities in the system;

set the first privilege for the second user with respect to the entity, wherein the setting overrides, specifically for the entity, the predetermined set of privileges associated with the pre-assigned role of the second user, by expanding or restricting privileges of the second user, with respect to the entity, relative to the predetermined set of privileges; and control access to the entity by the second user in accordance with the set first privilege.

12. The entity presentation system according to claim 11, wherein the at least one processor is further configured to execute the instructions to:

determine whether the first privilege is included in a first predetermined set of privileges associated with the pre-assigned role of the second user; and set the first privilege for the second user with respect to the entity based on determining that the first privilege is included in the first predetermined set of privileges associated with the pre-assigned role of the second user.

13. The entity presentation system according to claim 12, wherein the at least one processor is further configured to execute the instructions to:

receive the third user input for selecting the first privilege and a second privilege from among the predetermined plurality of privileges for accessing entities in the system;

determine whether the second privilege is included in the first predetermined set of privileges associated with the pre-assigned role of the second user; and control to output a notification on the GUI indicating that the selected second privilege is not assignable to the second user, based on determining that the second privilege is not included in the first predetermined set of privileges.

14. The entity presentation system according to claim 13, wherein the at least one processor is further configured to execute the instructions to:

output the notification by changing a display characteristic of an identifier of the second user displayed in response to the second user input for selecting the second user.

15. The entity presentation system according to claim 11, wherein the at least one processor is further configured to execute the instructions to:

determine whether the first privilege is included in a second predetermined set of privileges associated with a role of the first user pre-assigned to the first user from among the plurality of predetermined roles; and set the first privilege for the second user with respect to the entity based on determining that the first privilege is included in the second predetermined set of privileges associated with the pre-assigned role of the first user.

16. The entity presentation system according to claim 15, wherein the at least one processor is further configured to execute the instructions to:

receive the third user input for selecting the first privilege and a second privilege from among the predetermined plurality of privileges for accessing entities in the system;

determine whether the second privilege is included in the second predetermined set of privileges associated with the pre-assigned role of the first user; and control to output a notification on the GUI indicating that the selected second privilege is not assignable to the second user, based on determining that the second privilege is not included in the second predetermined set of privileges.

17. The entity presentation system according to claim 11, wherein the at least one processor is further configured to execute the instructions to:

receive a request from the second user to access another entity generated by the entity presentation system;

determine whether one or more entity privileges with respect to the other entity are set for the second user; and control access by the second user to the other entity in accordance with a first predetermined set of privileges associated with the pre-assigned role of the second user, based on determining that the one or more entity privileges with respect to the other entity are not set for the second user.

18. The entity presentation system according to claim 17, wherein the at least one processor is further configured to execute the instructions to:

control access by the second user to the other entity in accordance with the one or more entity privileges and not the first predetermined set of privileges associated with the pre-assigned role of the second user, based on determining that the one or more entity privileges with respect to the other entity are set for the second user.

19. The entity presentation system according to claim 11, wherein the at least one processor is further configured to execute the instructions to control to send to the second user an invitation to access the entity in accordance with the set first privilege.

20. A non-transitory computer-readable recording medium having recorded thereon instructions executable by at least one processor to perform a method of setting privileges for a user on an entity basis in an entity presentation system, the method comprising:

based on a first user input from a first user to set privileges of users with respect to an entity generated by the entity presentation system, controlling to output a graphical user interface (GUI) for setting the privileges with respect to the entity;

receiving a second user input, from the first user through the GUI, for selecting a second user, the second user having a role pre-assigned to the second user from among a plurality of predetermined roles in the entity presentation system, and each of the plurality of predetermined roles respectively being associated with a predetermined set of privileges, with respect to the entity presentation system as a whole, from among a predetermined plurality of privileges for users with respect to the entity presentation system;

receiving a third user input, from the first user through the GUI, for selecting, on an individual privilege basis, at least a first privilege from among the predetermined plurality of privileges for accessing entities in the system;

setting the first privilege for the second user with respect to the entity, wherein the setting overrides, specifically for the entity, the predetermined set of privileges associated with the pre-assigned role of the second user, by expanding or restricting privileges of the second user, with respect to the entity, relative to the predetermined set of privileges; and controlling access to the entity by the second user in accordance with the set first privilege.

* * * * *